United States Patent [19]

Edmondson

[11] Patent Number: 5,714,048

[45] Date of Patent: Feb. 3, 1998

[54] METHOD AND APPARATUS FOR OIL/WATER DE-EMULSIFICATION

[76] Inventor: Jerry M. Edmondson, 510 Canal St., Newport Beach, Calif. 92663

[21] Appl. No.: 609,498

[22] Filed: Mar. 1, 1996

Related U.S. Application Data

[63] Continuation-in-part of Ser. No. 271,718, Jul. 7, 1994, abandoned.

[51] Int. Cl.$^6$ .................. C10G 33/02; B01D 17/038; B01D 17/06
[52] U.S. Cl. ........................... 204/563; 204/671
[58] Field of Search .................. 204/563, 564, 204/671, 565

[56] References Cited

U.S. PATENT DOCUMENTS

| | | | |
|---|---|---|---|
| 1,565,997 | 12/1925 | Girvin | 204/188 |
| 3,207,686 | 9/1965 | Jarvis et al. | 204/302 |
| 4,116,790 | 9/1978 | Prestridge | 204/188 |
| 4,341,617 | 7/1982 | King | 204/302 |
| 5,565,078 | 10/1996 | Sams | 204/671 |

Primary Examiner—Kathryn L. Gorgos
Assistant Examiner—William T. Leader
Attorney, Agent, or Firm—James G. O'Neill

[57] ABSTRACT

An apparatus and method for combining the effects of centrifugal force and electrostatic coalescence of water droplets in an integral containment vessel to de-emulsify water in oil type emulsions, without utilizing chemicals or applying heat to reduce the viscosity of the emulsion.

4 Claims, 1 Drawing Sheet

METHOD AND APPARATUS FOR OIL/WATER DE-EMULSIFICATION

CROSS REFERENCE TO RELATED APPLICATION

This is a Continuation-In-Part of application Ser. No. 08/271,718, filed Jul. 7, 1994, now abandoned.

BACKGROUND OF THE INVENTION

1. Field of the Invention

This invention relates generally to the removal of water droplets finely dispersed in oil, and more particularly, to the removal of water droplets from oil without using chemicals or heating the oil.

2. Description of Related Art

The use of chemicals or heat as an aid to de-emulsify oil/water mixtures is well known. For example, heating the oil reduces the viscosity of the oil thus permitting any water drops therein to fall more rapidly through the oil. However, both the use of chemicals and the heating of oil tends to be expensive, and heating has the further disadvantage of consuming fuel energy.

SUMMARY OF THE INVENTION

The general object of the present invention is to eliminate the need for reducing the viscosity of the oil and thus eliminate the necessity of chemically treating and/or heating the oil and eliminate the consumption of fuel energy. The need for reduction of the oil viscosity is supplanted, with the present invention, by utilizing centrifugal flow and electrical coalescence to enhance the separation of water from the viscous oil.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to describe an improved oil/water de-emulsifier.

Figure 1:
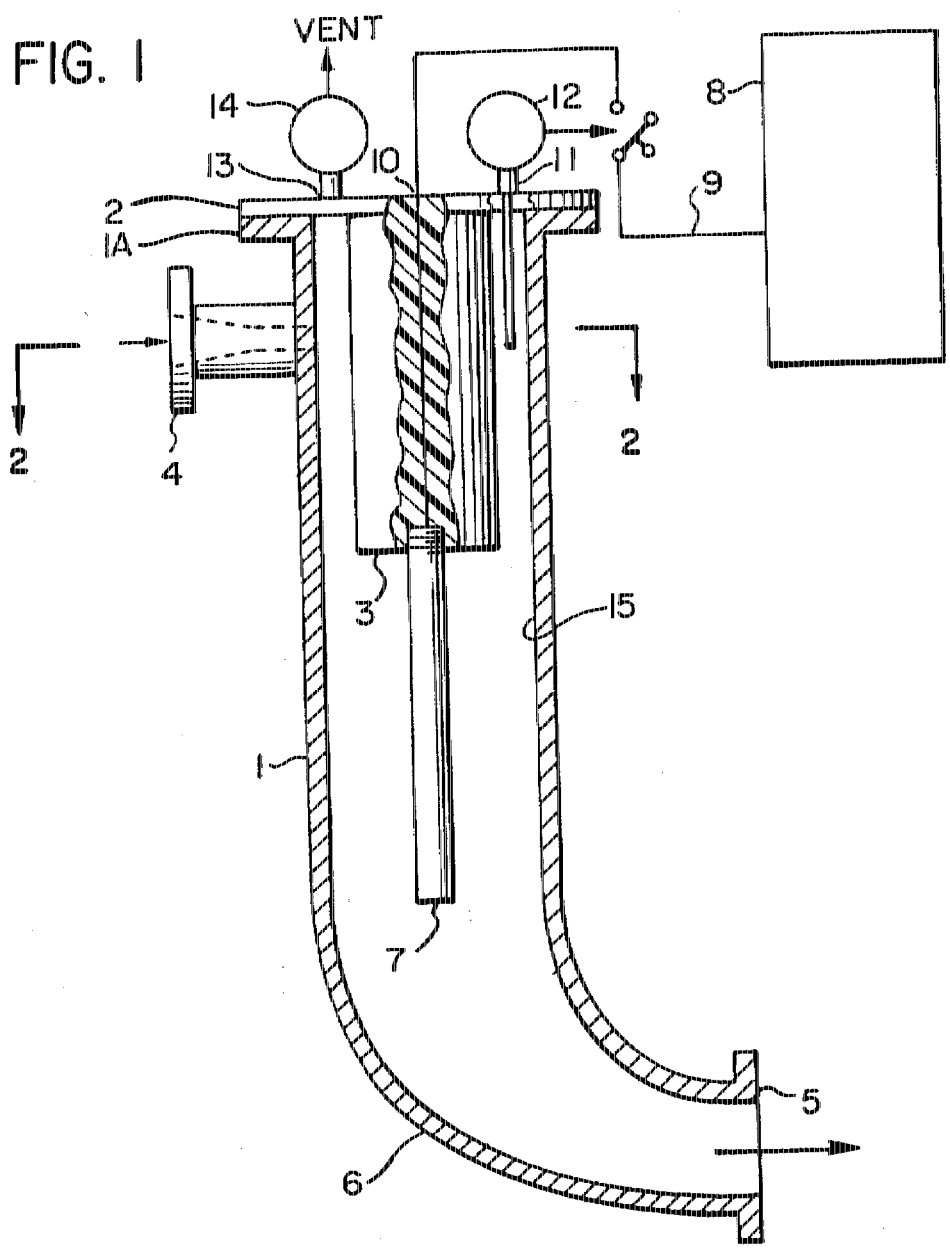
FIG. 1 is a cross sectional schematic view illustrating all of the essential elements of a preferred embodiment of the invention.
Figure 2:
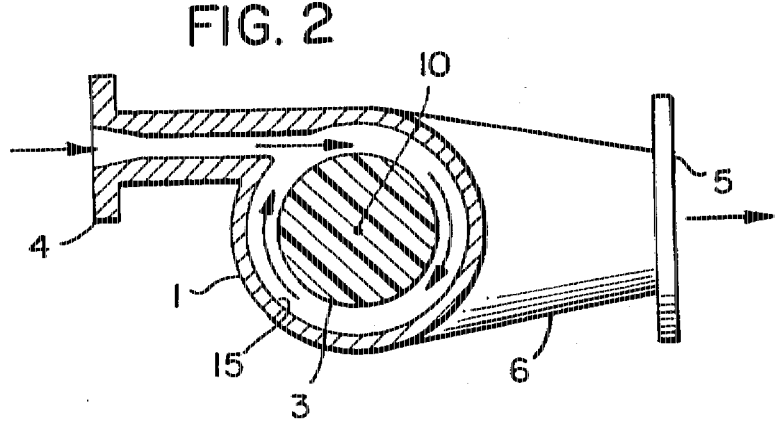
FIG. 2 is a cross section of the apparatus showing the construction of a centrifugal flow entrance arrangement.

Referring to FIG. 1, there shown is a containment vessel 1 constructed of electrically conductive material, such as steel. The vessel is preferably formed so as to have a cylindrical elongated shape along a vertical centerline. The vessel is electrically grounded. An upper end 1A of the vessel is sealed by a closure means 2 constructed from an electrically non-conductive material, such as fiberglass reinforced plastic. A centered, cylindrical, elongated extension 3 is connected to the closure and projects inwardly into an interior chamber 15 of the containment vessel, in such a manner as to reduce the annular inside cross sectional area of the containment vessel.

As shown, an inlet opening 4 is formed in upper end 1A. The inlet has an inside cross sectional opening area that will impart sufficient velocity to the oil/water fluid flowing into the interior chamber 15 of the containment vessel. Near the lower end the interior of chamber of the containment vessel 15 is an outlet opening 5. The inlet opening 4 is preferably located on a tangent to the outside wall of the containment vessel to provide for the centrifugal flow of the fluid entering the containment vessel, sufficient to move the free water in the oil/water mixture to the periphery, to thereby effectively form a ground to the interior wall of the containment vessel.

The outlet opening 5 is in the form of a ninety degree angularly curved elbow 6 to establish a smooth outlet transition from the containment vessel. The closure extension 3 extends downwardly from the closure 2 centrally into the containment vessel, and includes an electrode, formed by a round bar 7, constructed of electrically conductive material, such as stainless steel. A power supply 8 is connected to the electrode 7 by a pressure sealed electrically conductive wire 9 that passes through an opening 10 in the closure 2 to electrically charge the electrode. The closure 2 also contains an opening 11 to which is attached a liquid level sensor 12 that interrupts the power supply in the event of a low liquid level. Additionally, the closure contains a further opening 13 to which is connected a vapor venting device 14, to prevent free vapor from becoming entrapped in the containment vessel.

Operation

The oil/water mixture is sent to the containment vessel 1 through the tangential inlet 4, as by a pumping means, not shown. The velocity of the incoming fluid depends on the pressure applied by the pumping means, and is increased by the reduced cross sectional opening area of the inlet nozzle. The flow velocity is also increased by the closure's extension 3, which protrudes into the inlet area of the containment vessel, thereby reducing the cross sectional open area of that part of the containment vessel, thus causing the fluid to flow at a higher velocity to impart a further centrifugal motion to the fluid. Free water, being heavier than the oil, will migrate toward the outside perimeter of the fluid, to the inside of the wall, because of the centrifugal force. An electrical field is created by electricity flowing between the electrically charged electrode 7, and the electrically grounded containment vessel wall, because of the layer of water from the free water thereon. Water droplets entrained in the oil will receive an electrical charge upon passing downwardly through the electric field, causing coalescence of the small water droplets into larger drops. The oil thusly processed, will be discharged from the containment vessel in a de-emulsified condition and can be connected to or shipped to a receiver located in a downstream relationship to the de-emulsifier, for segregation of the oil and water.

Having thoroughly described the method, for de-emulsifying an oil/water mixture employed by the invention, and the apparatus for carrying out the method, no further description of the apparatus is required.

Those skilled in the art will appreciate that the above-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. A de-emulsifier for de-emulsifying a water-in-oil emulsion passing through said de-emulsifier, said de-emulsifier comprising, in combination:
   a) a vertical, generally cylindrical vessel having an open upper end, a side wall, and a lower end formed as an angularly curved elbow terminating in an outlet oriented at an angle of about ninety degrees with respect to the central axis of the cylindrical vessel to establish a smooth transition from the interior of the vessel to said outlet;
   b) an inlet located in said side wall adjacent the upper end and oriented in a direction tangential to said side wall;
   c) means for introducing the emulsion into said vessel through said inlet with sufficient velocity to impart centrifugal force to the emulsion;
   d) closure means constructed from an electrically insulating material for sealing said open upper end;
   e) a cylindrical, elongated extension connected to said closure means and projecting downwardly into the interior of said vessel to a location below said inlet, the extension being concentric with said vessel and serving to form an annular region of reduced cross sectional area adjacent said inlet which facilitates increased flow velocity to sustain the centrifugal force;
   f) a single, elongated electrode concentric with said vessel and extending downwardly from said elongated extension; and
   g) power supply means connected to said electrode by a wire that passes through an opening in said closure means for providing electricity to said electrode.

2. The de-emulsifier of claim 9, further including means for disconnecting said power supply means in the event of a low fluid level in said vessel.

3. The de-emulsifier of claim 2, further including means for venting vapor from said vessel.

4. A method for de-emulsifying a water-in-oil emulsion utilizing an electric field comprising the steps of:
   a) introducing the emulsion into an inlet of a de-emulsifier, wherein the de-emulsifier comprises;
      a vertical, generally cylindrical vessel having an open upper end, a side wall, and a lower end formed as an angularly curved elbow terminating in an outlet oriented at an angle of about ninety degrees with respect to the central axis of the cylindrical vessel to establish a smooth transition from the interior of the vessel to said outlet;
      the inlet being located in the side wall of the vessel adjacent the upper end and oriented in a direction tangential to the side wall;
      means for introducing the emulsion into said vessel through said inlet with sufficient velocity to impart centrifugal force to the emulsion;
      closure means constructed from an electrically insulating material for sealing said open upper end;
      a cylindrical, elongated extension connected to said closure means and projecting downwardly into the interior of said vessel to a location below said inlet, the extension being concentric with said vessel and serving to form an annular region of reduced cross sectional area adjacent said inlet which facilitates increased flow velocity to sustain the centrifugal force;
      a single, elongated electrode concentric with said vessel and extending downwardly from said elongated extension; and
      power supply means connected to said electrode by a wire that passes through an opening in said closure means for providing electricity to said electrode;
   b) activating the power supply means to create an electric field and to cause water droplets entrained in the oil to receive an electrical charge upon passing downwardly through the electric field causing coalescence of the droplets into larger drops; and
   c) flowing emulsion through the vessel with a velocity sufficiently high so that centrifugal force causes free water in the emulsion to migrate toward the side wall of the vessel.

* * * * *